United States Patent [19]
Hodgson

[11] 3,856,210
[45] Dec. 24, 1974

[54] FLAIL TYPE MATERIAL SPREADER
[75] Inventor: James H. Hodgson, Vinton, Iowa
[73] Assignee: Chromalloy American Corporation, St. Louis, Mo.
[22] Filed: Jan. 28, 1974
[21] Appl. No.: 436,967

[52] U.S. Cl. .............................. 239/658
[51] Int. Cl. ..................... A01c 3/06, A01c 15/14
[58] Field of Search ............ 239/658, 670; 222/176, 222/178

[56] References Cited
UNITED STATES PATENTS

| | | | |
|---|---|---|---|
| 3,121,568 | 2/1964 | Wilkes et al. | 239/658 |
| 3,174,757 | 3/1965 | Ferris | 239/658 |
| 3,415,455 | 12/1968 | Ferris | 239/658 |
| 3,785,573 | 1/1974 | Crawford | 239/658 |

Primary Examiner—M. Henson Wood, Jr.
Assistant Examiner—John J. Love
Attorney, Agent, or Firm—Wegner, Stellman, McCord, Wiles & Wood

[57] ABSTRACT

A flail type material spreader has an improved upper structure in which an upper side panel has a plurality of angularly related planar portions and terminates in an open recess which is substantially below the apex of the cylinder of rotation of the flails. A cover which also has a plurality of angularly related planar portions includes a pivot tube which is journalled in the recess on pivot bosses that are on upper end panels, and the free edge of the cover has parts defining an open pocket. A cover extension is pivotally mounted on the ends of the cover outside the pocket, and includes a structural tube below the pivotal mounting that projects into the pocket, with a body that also has several angularly related planar portions.

11 Claims, 4 Drawing Figures

Fig. 2.

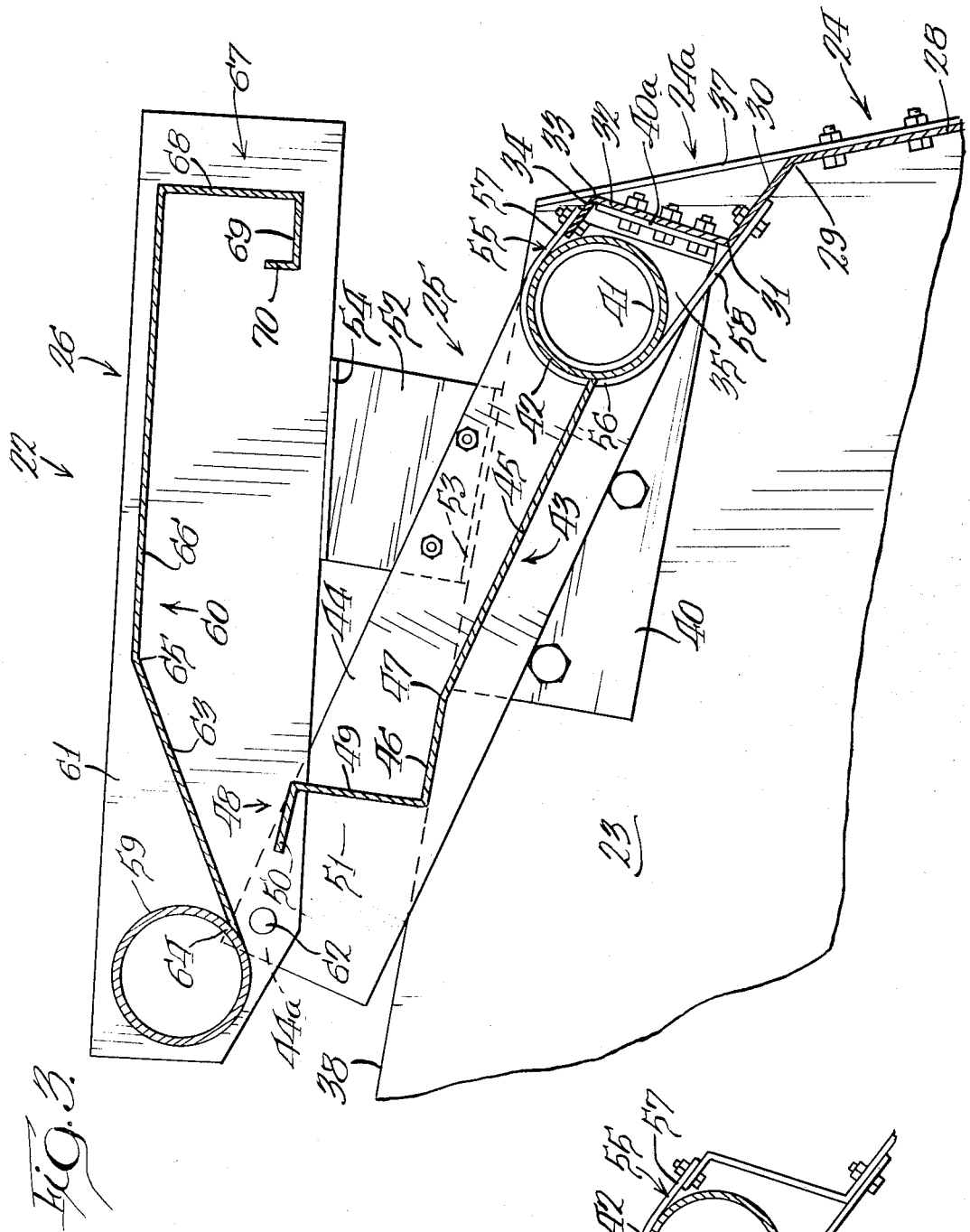
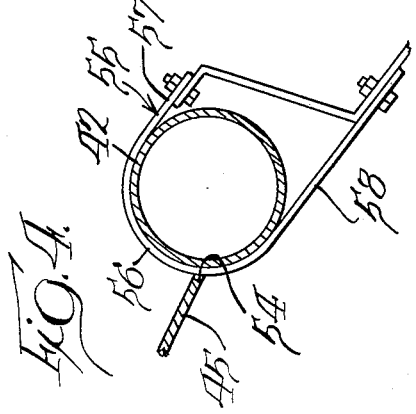

FLAIL TYPE MATERIAL SPREADER

BACKGROUND OF THE INVENTION

The present invention relates to material spreaders of the type first disclosed in Elwick U.S. Pat. No. 2,886,332. Such spreaders, in common with other types of farm machinery intended for field use, must be extremely strong and rugged; but at the same time must be simple and inexpensive.

Material spreaders used on a farm are commonly loaded either by a front end loader or by an endless conveyor that is used to move material out of the gutters of a cow barn. When filled, the spreader is drawn behind a tractor to a field where the contents is spread on the ground. The spreader is subjected to extremely rough use as it is towed over rough ground and ploughed fields. In addition, the material spreaders are left outside in all kinds of weather, and it is desirable that any water or ice which collects on the machine outside the container may be easily removed and preferably dumped into the container.

Any flail type material spreader includes a container which is essentially the bottom half of a cylinder, and also includes an upper structure which provides the end walls and a sidewall of the container that is opposite to the open side over which the flails discharge the material from the container. Desirably the upper structure includes a shield, or hood, which has a free edge that is substantially above the open side of the container when the machine is being used to spread material. However, the hood must be movable to expose a large part of the width of the container for easy loading, either with a front end loader or from an elevating conveyor.

Prior art upper structures for flail type spreaders have either been inadequate as hoods, or if adequate they have been undesirably heavy and expensive.

SUMMARY OF THE INVENTION

The principal object of the present invention is to provide an improved upper structure for flail type material spreaders.

Another object of the invention is to provide an upper structure which is strong and rugged, but comparatively lightweight and inexpensive.

Still another object is to provide an upper structure for a flail type spreader which includes a side panel, a cover hinged on the side panel, and a cover extension hinged on the free edge of the cover, all of said elements being rigid structures but without requiring any braces or ribs to rigidify the sheet metal.

Still another object of the invention is to provide an upper structure in which the cover and cover extension, when moved to open position, uncover a large part of the side-to-side span of the container.

Still another object of the invention is to provide an upper structure in which water or ice which collects upon the cover extension is automatically dumped into the container when the cover extension is moved from its closed to its open position.

THE DRAWINGS

FIG. 2 is a sectional view on an enlarged scale, taken substantially as indicated along the line 2—2 of FIG. 1 with the cover and cover extension in closed position and with the chain guard removed; and FIG. 3 is a fragmentary sectional view on an enlarged scale, showing the details of the upper sidewall, the cover and the cover extension, with the cover closed and the cover extension open.

FIG. 4 is a fragmentary sectional view showing the relationship between the cover and the center strap.

DETAILED DESCRIPTION OF THE INVENTION

Figure 1:
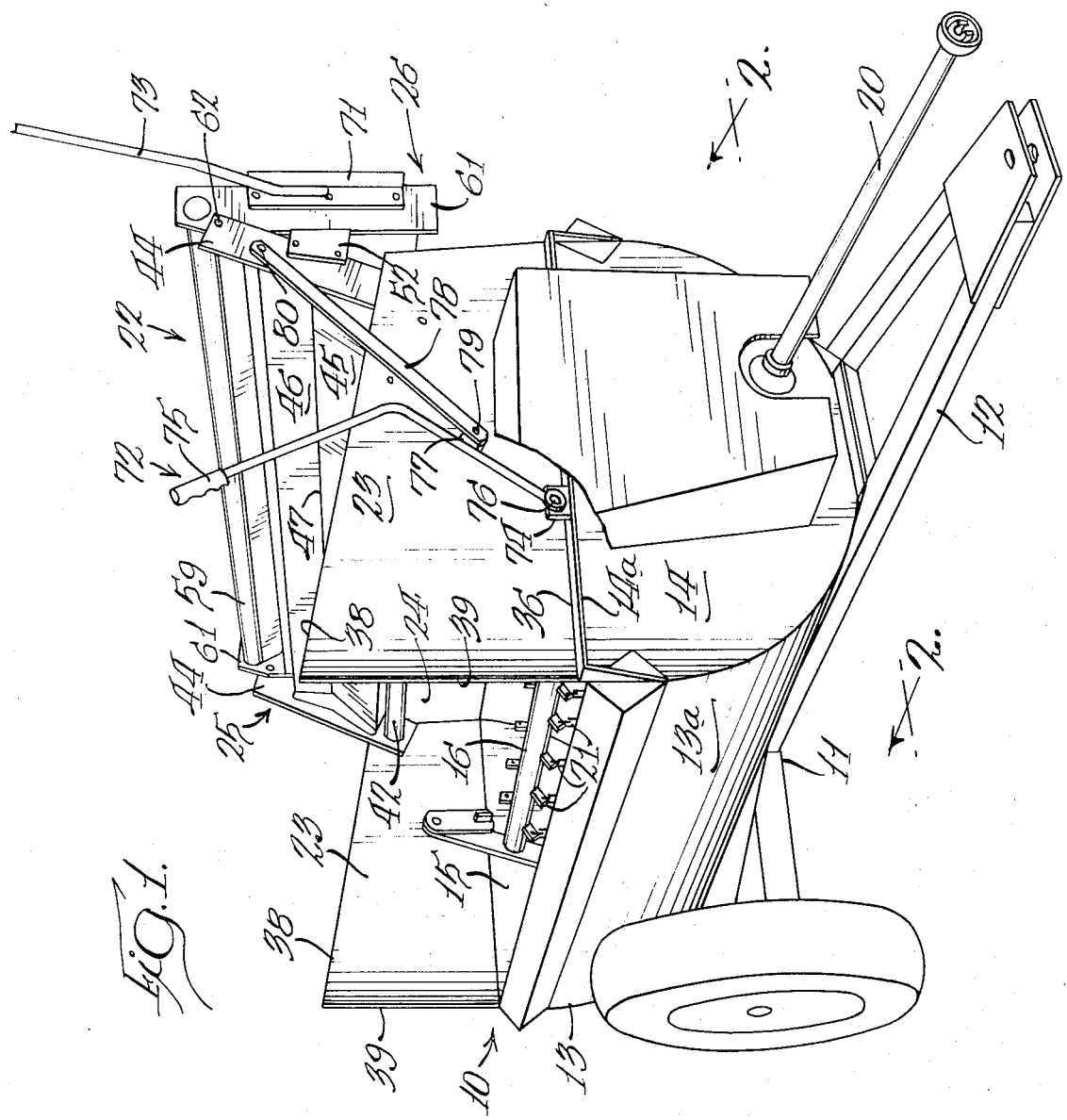
FIG. 1 is a perspective view of a flail type material spreader having the improved upper structure of the present invention, the cover and cover extension being in open position.
Figure 2:
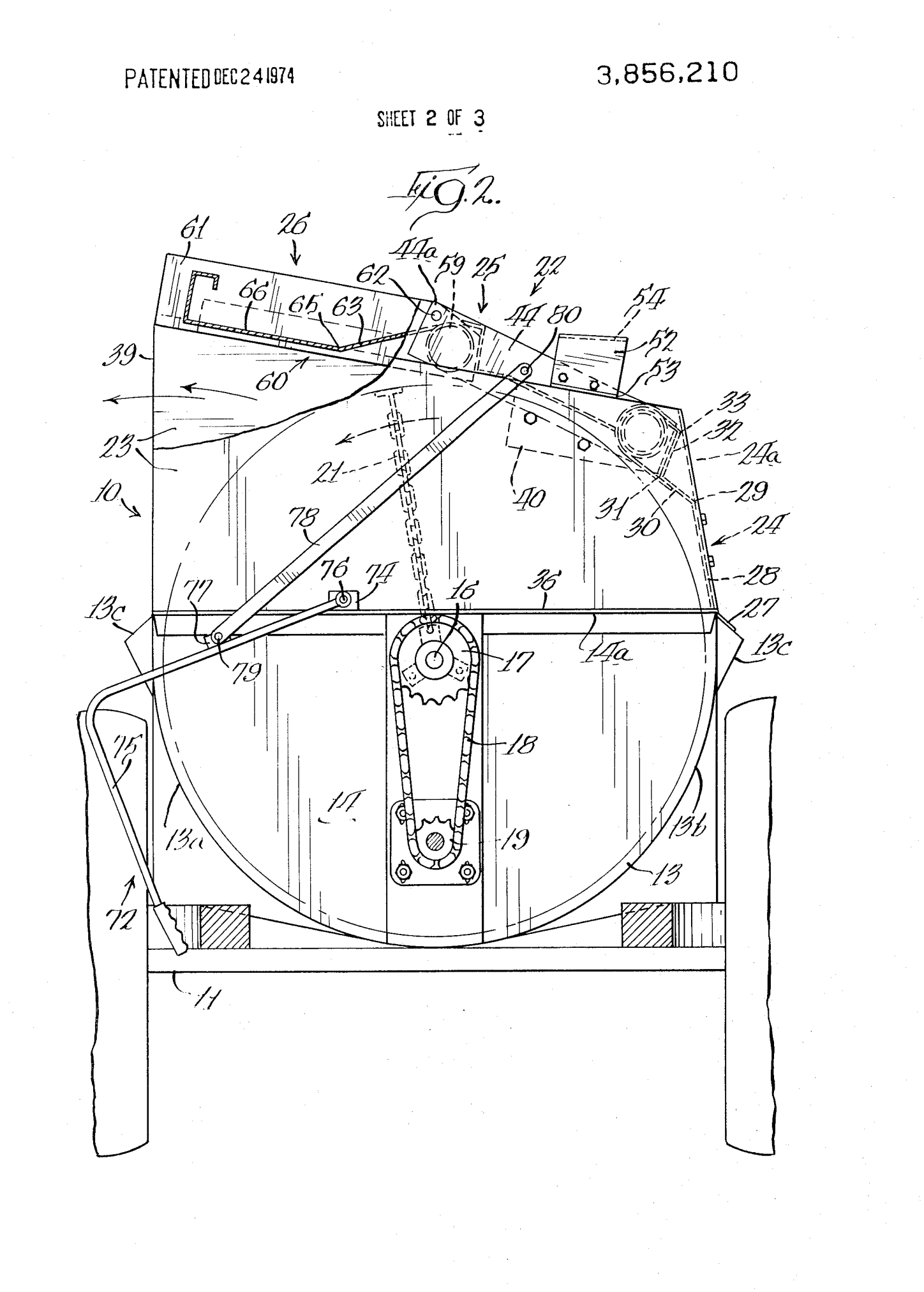

Referring to the drawings, and referring first to FIGS. 1 and 2, a flail type spreader, indicated generally at 10, has a wheeled chassis 11 the forward portion of which provides a draft tongue 12 which is adapted to be connected to the draw bar of a farm tractor. Mounted on the chassis is a container 13 which is generally in the form of the bottom half of a cylinder and has parallel front and rear end walls 14 and 15. A shaft 16 is journalled in bearings in the front and rear walls 14 and 15, and has a forward end portion forward of the front wall where it is provided with a drive sprocket 17 so that it may be driven by a chain 18 from an input sprocket 19 that is driven from a conventional connection 20 from the tractor power takeoff. The shaft 16 is on the axis of a cylinder substantially the top half of which is a projection of the side wall of the container 13. Spaced along the shaft 16 are flails 21.

The present invention is directed entirely to an improved upper structure, indicated generally at 22, for a spreader of the type illustrated. The upper structure 22 consists generally of front and rear end panels 23, an upper side panel 24, a cover 25 which is hinged at the upper portion 24a, and a cover extension 26 which is hinged at the free edge of the cover. When the cover and cover extension are in their closed positions, the free edge of the latter is substantially directly above a first side 13a of the container over which the flails discharge material when the shaft 16 is driven, and the side panel 24 surmounts a second side 13b of the container. The sides 13a and 13b are provided with triangular sills 13c which are not part of the present invention, and the side panel 24 has a connecting flange 27 along its lower margin which is angled to overlie the sill 13c and is bolted to the sill.

Extending upwardly from the sill the side panel 24 has a lower portion 28 which is inclined from the vertical slightly toward the first side 13a of the container, and a first bend 29 separates the lower portion 28 from an intermediate portion 30 which is at an obtuse angle to the lower portion in a plane substantially tangent to the cylindrical projection of the container 13. A second bend 31 separates the intermediate portion 30 from an outwardly projecting portion 32, and a third bend 33 separates the outwardly projecting portion 32 from a marginal portion 34 which is generally parallel to the intermediate portion 30. The outwardly projecting portion 32 and the marginal portion 34 define a side and top of a recess 35 which is outside the projection of the cylinder and which is open toward the first side 13a of the container. The side panel portions 30, 32 and 34 form a Z section which provides a rigidifying beam along the upper portion 24a of the side panel.

The container front wall 14 is provided with a flange 14a, and the rear wall has a similar flange (not shown) respectively, and the end panels 23 of the upper structure have bottom flanges 36 which overlie the flanges such as 14a and are bolted thereto. In addition, the end panels have side flanges 37 which are in facing relationship to the end portions of the side panel lower portion 28, and the side flanges are bolted to the side panel lower portion. The end panels 23 have top edges 38 which are slightly inclined downwardly from the first side 13a toward the second side 13b of the container, and the end panels have edges 39 which extend upwardly substantially vertically from the first side 13a of the container.

Secured to the inner faces of the end panels 23 adjacent the side panel recess 35 are pivot boss plates 40, and aligned pivot bosses 41 are welded to the plates in the recess 35 at the upper portion 24a of the side panel 24. The pivot boss plates 40 have right angle flanges 40a which lie against the inner face of the side panel outwardly projecting portion 32 and are bolted to said portion 32.

The cover 25 is best seen in FIG. 3 to include a pivot tube 42 which is journalled on the pivot bosses 41, a sheet metal body, indicated generally at 43, and end panels 44 which are welded to the body 43.

The sheet metal body 43 includes a first body portion 45 which is marginally welded to the pivot tube 42, and a second body portion 46 which is joined to the first body portion 45 by a very shallow bend 47. Each of the body portions 45 and 46 is substantially in a plane tangent to the projection of the container cylinder when the cover 25 is in the closed position of FIG. 3. The sheet metal body 43 also has a free marginal portion, indicated generally at 48, that includes an outwardly projecting part 49 and a flange part 50 which are substantially at right angles to one another and form a pocket 51 which is outside and substantially at the apex of the projection of the cylinder when the cover is in its closed position.

Bolted to the cover end flanges 44 are support brackets 52 which have outturned bottom flanges 53 that support the cover on the top edges 38 of the upper end plates 23; and the support flanges 52 also have inwardly turned upper webs 54 which support the cover extension 26 when the latter is in its open position.

As seen in FIG. 4, midway between the ends of the body sheet 43 there is a slot 54 between the edge of the body sheet and the pivot tube 42; and a U-shaped center strap 55 has its bight portion 56 extending through the slot 54 so that its upper arm 57 and its lower arm 58 embrace the pivot tube 42. The upper strap arm 57 is bolted to the outer surface of the sidewall marginal portion 34, while the lower arm 58 lies against the inner face of the intermediate portion 30 of the upper side panel 24 and is bolted thereto. Thus, the strap 55 affords a simple support for the central portion of the cover 25 in which the pivot tube 42 rotates.

The cover extension 26 includes a structural tube 59, a body sheet, indicated generally at 60, and end flanges 61. The inner portions of the cover extension end flanges 61 are overlapped by outer end portions 44a of the cover end flanges 44 which extend beyond the pocket 51; and the cover extension is pivotally mounted on said forwardly extending portion 44a by bolts 62. The sheet metal body 60 of the cover extension 26 has a first body portion 63 adjacent a first margin 64 of the sheet metal body that is welded to a part of the structural tube 59 which is uppermost when the cover and cover extension are closed, and the first body portion 63 extends slightly downwardly from the margin 64 when the cover extension is closed, and a shallow bend 65 separates the first body portion 63 from a second body portion 66 which is at a large obtuse angle to said first body portion and nearly parallel to the plane of the top edges 38 of the upper end panels 23 when the cover extension is closed. In addition, the cover extension body 60 includes a marginal portion, indicated generally at 67, which forms a flange that includes an upright web 68 substantially at right angles to the body portion 66, a parallel web 69 and a marginal web 70. Bolted to the end flanges 61 of the cover extension are cover extension support flanges 71 which rest upon the top edges 38 of the end panels 23 when the cover extension is closed.

Movement of the cover extension 26 and the cover 25 between their closed positions as seen in FIG. 2 and their open position as seen in FIG. 1 is accomplished by lever means, indicated generally at 72, and by a lever arm 73 which is mounted upon one of the cover extension support flanges 71. The lever arm 73 provides a convenient handle affording substantial mechanical advantage for moving the cover extension 26 from its closed position to its intermediate position.

The lever means 72 includes a mounting bracket 74 which is secured to an upper end panel flange 36 at the forward end of the spreader, and a lever arm 75 is pivoted on the bracket 74 at 76. The lever arm 75 has two angularly related portions, and on one of those portions is a pivot boss 77 to which a cover operating link 78 is pivotally connected at 79, the opposite end of said link 78 being pivoted at 80 to the cover end panel 44 which is at the front of the spreader.

The dimensions of the lever arm 75, the link 78 and the cover 25 are such that when the lever arm 75 is used to pivot the cover to the open position of FIG. 1, the lever arm and link hold the cover in a position which is slightly past the vertical.

As best seen in FIG. 2, the pivot bosses 41 for the cover pivot tube 42 are in a horizontal plane which is substantially below the apex of the cylindrical projection, and the axis of the pivot bosses is at an angle of no more than about 45° above a horizontal plane through the axis of the spreader shaft 16. This places the pivot tube 42 in a vertical plane which is quite close to the top margin of the container side 13b, so that when the cover extension 26 and the cover 22 are in the open position of FIG. 1, nearly the entire span between the sills 13c is available for loading the container.

The foregoing detailed description is given for clearness of understanding only and no unnecessary limitations should be understood therefrom, as modifications will be obvious to those skilled in the art.

I claim:

1. In a material spreader of the type which has a container generally in the form of the bottom half of a cylinder with parallel end walls, a shaft journalled on the axis of said cylinder, flexible flails on said shaft, and means for driving said shaft so the flails discharge material over a first side of said container, a spreader upper structure comprising, in combination:

an upper side panel surmounting the second side of said container, said upper side panel having a plurality of angularly related planar portions all of which lie outside but closely adjacent to a cylindrical projection of said half a cylinder, the two uppermost of said portions defining a side and top of a recess which is open toward the first side of the container and forming a rigidifying beam;

upper end panels surmounting the end walls, said upper end panels having nearly horizontal top edges;

means connecting said upper end panels to said upper side panel;

opposed pivot bosses on the end panels which extend into said recess;

a cover which includes a pivot tube journalled on said pivot bosses, a sheet metal body which has a first marginal portion secured to said pivot tube, a plurality of angularly related planar body portions all of which lie outside of but closely adjacent to said cylindrical projection, a free marginal body portion having angularly related parts defining a pocket which is close to the apex of the container and which is open toward the first side of the container, and parallel upright flanges at the ends of said cover which project beyond the open side of said pocket;

interengaging means on the cover end flanges and on the upper end panels to support the cover in closed position;

a cover extension pivotally mounted on the projections of the cover end flanges outside the pocket, said cover extension including a tube which is below said pivotal mounting and partly within said pocket in spaced relationship to the cover parts that define the pocket, a sheet metal body which has a first marginal portion secured to the upper part of said tube, a plurality of angularly related planar body portions including a marginal portion forming an upstanding flange, and parallel upright end plates including means resting on the top edges of the end panels when the cover extension is closed, and lever means at an end of the spreader for moving said cover extension and said cover between their closed and open positions, said cover extension being rotatable by said lever means on its pivotal mounting to an open position resting on the upper webs of the support brackets, and the cover being rotatable on the pivot bosses by said lever means, when the cover extension is open, to an open position inclined outwardly from the vertical.

2. The combination of claim 1 in which the pivot bosses for the cover pivot tube are in a horizontal plane which is substantially below the apex of the cylindrical projection.

3. The combination of claim 1 in which the axis of the pivot bosses for the cover pivot tube is at an angle of no more than about 45° above a horizontal plane through the axis of the spreader shaft.

4. The combination of claim 1 in which the first marginal portion of the cover body has a central notch in its margin, and a U-shaped center strap loosely embraces the pivot tube, said strap having a lower leg beneath and secured to a planar portion of the upper side panel and having an upper leg extending through said notch, overlying and secured to the portion of the upper side panel which defines the top of the recess.

5. The combination of claim 1 in which the upper end panels have integral side flanges in facing relationship to the end portions of one of the upper side panel portions, and the means connecting the upper end panels to the upper side panel engage said integral side flanges.

6. The combination of claim 1 which includes flat plates secured in facing relationship to the inner surfaces of the upper end panels in the planes of the cover end flanges, and in which the pivot bosses are integral with said plates.

7. The combination of claim 1 which includes a pair of upstanding support members secured to and extending inwardly from the cover end flanges adjacent the tube, said support members being part of the interengaging means that supports the cover in closed position, and the cover extension resting on said support members in open position.

8. In a material spreader of the type which has a container generally in the form of the bottom half of a cylinder with parallel end walls, a shaft journalled on the axis of said cylinder, flexible flails on said shaft, and means for driving said shaft so the flails discharge material over a first side of said container, a spreader upper structure comprising, in combination:

an upper side panel surmounting the second side of the container and lying wholly outside but closely adjacent to a cylindrical projection of said half a cylinder;

upper end panels surmounting the end walls, said upper end panels having nearly horizontal top edges;

means connecting said upper end panels to said upper side panel;

opposed pivot bosses on the end panels outside said cylindrical projection and close to the top of the upper side panel;

a cover which includes a pivot tube journalled on said pivot bosses, a sheet metal body which has a first marginal portion secured to said pivot tube, a plurality of angularly related planar body portions all of which lie outside of but closely adjacent to said cylindrical projection, a free marginal body portion having angularly related parts defining a pocket which is close to the apex of the container and which is open toward the first side of the container, and parallel upright flanges at the ends of said cover which project beyond the open side of said pocket;

interengaging means on the cover end flanges and on the upper end panels to support the cover in closed position;

a cover extension pivotally mounted on the projections of the cover end flanges outside the pocket, said cover extension including a tube which is below said pivotal mounting and partly within said pocket in spaced relationship to the cover parts that define the pocket, a sheet metal body which has a first marginal portion secured to the upper part of said tube, a plurality of angularly related planar body portions including a marginal portion forming an upstanding flange, and parallel upright end plates including means resting on the top edges of the end panels when the cover extension is closed, and lever means at end of the spreader for moving said cover extension and said cover between their closed and open positions, said cover extension being rotatable by said lever means on its pivotal mounting to an open position, and the cover being rotatable on the pivot bosses by said lever means, when the cover extension is open, to an open position inclined outwardly from the vertical.

9. The combination of claim 8 in which the pivot bosses for the cover pivot tube are in a horizontal plane which is substantially below the apex of the cylindrical projection.

10. In a material spreader of the type which has a container generally in the form of the bottom half of a cylinder with parallel end walls, a shaft journalled on the axis of said cylinder, flexible flails on said shaft, and means for driving said shaft to the flails discharge material over a first side of said container, a spreader upper structure comprising, in combination:

an upper side panel surmounting the second side of said container, said upper side panel having a lower portion which is inclined from the vertical slightly toward said first side, a first longitudinal bend separating said lower portion from an intermediate portion which is at an obtuse angle to the lower portion in a plane substantially tangent to a cylindrical projection of said half a cylinder, a second longitudinal bend separating said intermediate portion from an outwardly projecting portion, said second bend being in a horizontal plane which is substantially below the apex of the projection of the cylinder, and a third longitudinal bend separating said outwardly projecting portion from a marginal portion which is generally parallel to the intermediate portion, said last two named portions defining a recess outside the projection of the cylinder and forming a rigidifying beam;

upper end panels surmounting the end walls, said upper end panels having nearly horizontal top edges which are inclined slightly downwardly from the first side toward the second side of the container, and having side flanges in facing relationship to the end portions of the upper side panel lower portions;

means securing said side flanges to said upper side panel lower portions;

opposed pivot bosses on the end panels which extend into said recess;

a cover which includes a pivot tube journalled on said pivot bosses, a sheet metal body which has a first marginal portion secured to the lower part of said pivot tube with a central notch in said margin, two body portions joined by a very shallow bend, each of said body portions being substantially in a plane tangent to the projection of the cylinder, and a free marginal portion having an outwardly projecting part and a flange part substantially at right angles to one another, said parts forming a pocket which is outside and substantially at the apex of the projection of the cylinder, and parallel upright flanges at the ends of said cover which project beyond said pocket;

sheet metal plates secured in facing relationship to the inner surfaces of the upper end panels, the pivot bosses being integral with said plates;

a U-shaped center strap loosely embracing the pivot tube, said strap having a lower leg beneath and secured to the intermediate portion of the upper side panel and an upper leg extending through the central notch in the cover body margin, overlying and secured to the marginal portion of said upper side panel;

a pair of upstanding support brackets secured to the cover end flanges adjacent the tube, said support brackets having outturned lower webs that rest upon the upper end panels when the cover is closed, and said brackets having inturned upper webs;

a cover extension pivotally mounted on the projections of the cover end flanges beyond the pocket, said cover extension including a tube which is below said pivotal mounting and partly within said pocket in spaced relationship to the cover parts that define the pocket, the bottom part of said tube being substantially tangent to the projection of the cylinder and substantially at the apex thereof, a sheet metal body which has a first margin secured to the part of said tube which is uppermost when the cover extension is closed, a first body portion extending slightly downwardly from said first margin when the cover extension is closed, a second body portion at a large obtuse angle to said first body portion and nearly parallel to the plane of the top edges of the upper end panels, and a marginal portion forming a flange, parallel upright end plates, and cover extension support flanges which are secured to the cover end plates and rest upon the top edges of the end panels when the cover extension is closed;

and lever means at an end of the spreader for moving said cover extension and said cover between their closed and open positions, said cover extension being rotatable by said lever means on its pivotal mounting to an open position resting on the upper webs of the support brackets, and the cover being rotatable on the pivot bosses by said lever means, when the cover extension is open, to an open position inclined outwardly from the vertical and retained in said position by said linkage means.

11. The combination of claim 9 in which the axis of the pivot bosses for the cover pivot tube is at an angle of no more than about 45° above a horizontal plane through the axis of the spreader shaft.

* * * * *